Oct. 23, 1945. P. VENEY 2,387,545
NUT HOLDER
Filed May 27, 1943

Inventor
Peter Veney

By Clarence A. O'Brien
and Harvey B. Jacobson
Attorneys

Patented Oct. 23, 1945

2,387,545

UNITED STATES PATENT OFFICE 2,387,545

NUT HOLDER

Peter Veney, Wooster, Ohio

Application May 27, 1943, Serial No. 488,789

1 Claim. (Cl. 81—10)

The present invention relates to new and useful improvements on nut holders for use particularly in connection with dual wheels of motor vehicles, and has for its primary object to provide, in a manner as hereinafter set forth, novel means for positively retaining the outer nut, which secures the outer wheel, while the inner wheel securing nut is turned slightly but sufficiently to break the two nuts loose from each other.

Other objects of the invention are to provide a nut holder of the aforementioned character which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
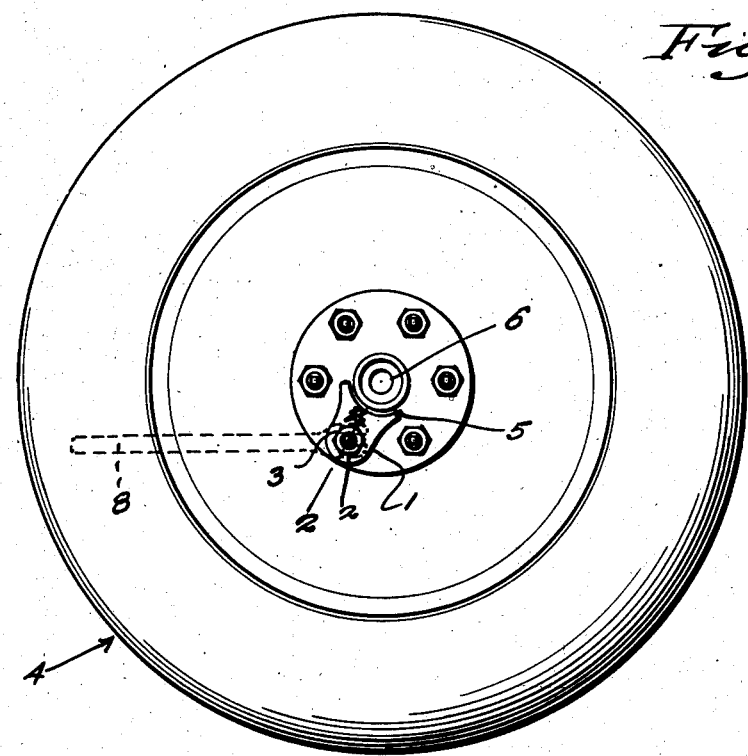
Figure 1 is a view in side elevation, showing a nut holder constructed in accordance with the present invention in use.

Referring now to the drawing in detail, it will be seen that the embodiment of the invention, which has been illustrated, comprises a plate 1 of suitable metal. The plate 1 has formed therein a hexagonal opening 2 for the reception of the outer or female nut 3 of a conventional dual wheel assembly 4.

Figure 3:
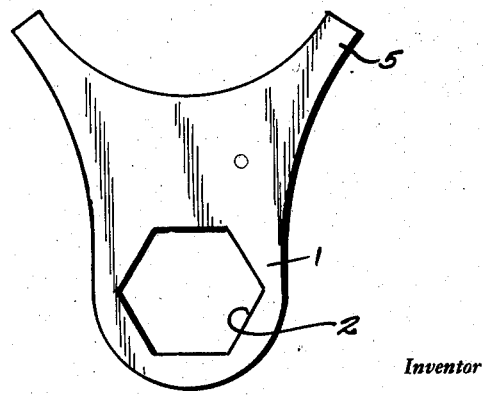
Figure 3 is a view in side elevation of the device.

The plate 1 has formed thereon a fork or yoke 5 providing a convex end edge as shown in Figs. 1 and 3. The fork or yoke 5 is adapted to straddle the hub 6 of the wheel 4 for positively retaining the nut 3 against rotation with the inner or male nut 7.

It is thought that the manner in which the invention functions will be readily apparent from a consideration of the foregoing. Briefly, if the nuts 3 and 7 turn together when an attempt is made to remove the former, the plate 1 is slipped on said nut 3 to lie against the outer wheel portion and the fork or yoke 5 is snugly engaged with the hub 6 of the wheel. A suitable wrench 8 is then applied to the nut 7 and said nut is tightened slightly on the usual threaded shank 9, thereby "breaking" the nuts. The plate 1 is then removed and the outer nut may be threaded off the inner nut 7 without further difficulty.

Figure 2:
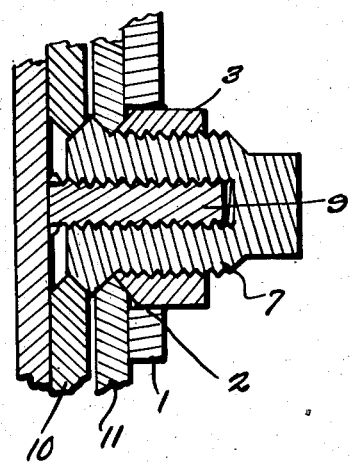
Figure 2 is a sectional view, taken substantially on the line 2—2 of Figure 1.

In Figure 2 of the drawing, reference numerals 10 and 11 designate portions of the inner and outer wheels, respectively.

It is believed that the many advantages of a nut holder constructed in accordance with the present invention will be readily understood, and although a preferred embodiment of the device is as illustrated and described, it is to be understood that changes in the details of construction may be resorted to which will fall within the scope of the invention as claimed.

What is claimed is:

A device for application to the outer female nut of a dual wheel assembly, wherein a portion of an inner wheel is held by an inner male nut and a portion of an outer wheel is held by the outer female nut threaded on the intermediate portion of said inner male nut beside the circular hub of the wheel, comprising a flat plate having a polygonal opening at one end to snugly fit over the female nut so that the plate may lie against the outer wheel portion, said plate being formed at its other end with a fork providing a convex end edge and adapted to snugly embrace a portion of the wheel hub when the plate is fitted over the female nut, whereby to hold the female nut against turning while the inner male nut is turned to loosen the engagement between the nuts and the portion of the outer wheel.

PETER VENEY.